United States Patent
Suzuki

(10) Patent No.: US 6,526,798 B2
(45) Date of Patent: Mar. 4, 2003

(54) METHOD OF BLANKING ELEMENT FOR BELT FOR CONTINUOUSLY VARIABLE TRANSMISSION

(75) Inventor: Tetsuo Suzuki, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/864,193

(22) Filed: May 25, 2001

(65) Prior Publication Data
US 2001/0047678 A1 Dec. 6, 2001

(30) Foreign Application Priority Data
May 26, 2000 (JP) ........................................ 2000-155855

(51) Int. Cl.⁷ .............................................. B21D 28/14
(52) U.S. Cl. .............................. 72/330; 72/326; 83/686; 83/694
(58) Field of Search ........................ 72/326, 330, 331, 72/336, 340; 83/686, 690, 694

(56) References Cited

U.S. PATENT DOCUMENTS 4,894,049 A * 1/1990 Koppelaars ................. 474/240
5,235,881 A * 8/1993 Sano et al. .................... 72/333
5,247,862 A * 9/1993 Haack .......................... 83/124
5,458,717 A * 10/1995 Kurita ............................ 83/31
5,992,280 A * 11/1999 Oishi et al. .................... 72/334

FOREIGN PATENT DOCUMENTS

JP 08-010882 5/1996
JP 11-309522 2/2000

* cited by examiner

Primary Examiner—Daniel C. Crane
(74) Attorney, Agent, or Firm—Birch, Stewart, Kolasch & Birch, LLP

(57) ABSTRACT

The cutting edge of a die and the cutting edge of a punch are spaced more widely from each other in a range of an element which includes a neck and undercuts than in the other range of the element. The element is blanked out of a metal sheet by the die and the punch. Edges of the neck and the undercuts are formed of a sheared surface in a transverse direction and a ruptured surface contiguous to the sheared surface. A burr is formed next to the ruptured surface in a position out of contact with endless rings.

5 Claims, 6 Drawing Sheets

METHOD OF BLANKING ELEMENT FOR BELT FOR CONTINUOUSLY VARIABLE TRANSMISSION

BACKGROUND OF THE INVENTION

1. Field of the Invention

The present invention relates to a method of blanking an element for a belt for use in a continuously variable transmission.

2. Description of the Related Art

Elements for belts for use in continuously variable transmissions comprise a body and a head joined to the body by a neck. A plurality of such elements are assembly as follows: The elements are stacked, with their faces held closely against backs of adjacent ones, into an annular shape, and endless rings are mounted in recesses defined between the bodies and the heads to bind the elements together in the annular form, thus producing a belt for use in a continuously variable transmission. The bodies of the elements are positioned on an inner circumferential side of the annular belt and have opposite side edges located for contact with pulleys of the continuously variable transmission.

An element of the type described above is blanked out of a metal sheet by pressing a punch that is complementary in shape to the element against the metal sheet that is placed on the die of a press. Since the opposite side edges of the body which are positioned for contact with pulleys of the continuously variable transmission need to be sheared to shape highly accurately, cutting edges of the die and the punch are spaced from each other by a gap that is set to a relatively small distance, which is about 0 to 1% of the thickness of the element, along the outer profile of the element. The die and punch are capable of producing a highly accurate element with a transversely wide sheared surface along the blanked edges of the element.

As shown in FIG. 5(b) of the accompanying drawings, the element thus produced has a burr f formed on an edge corner on the side of the element that is pressed by the punch and rising continuously from a sheared surface d. The element that has been blanked is processed by barrel polishing to remove the burr f.

According to the deburring process based on the barrel polishing, however, the medium may not enter fully into the recesses between the body and the head, possibly failing to remove the burr sufficiently from the opposite sides of the neck that are positioned deeply in the recesses. Any burrs remaining on the opposite sides of the neck tend to contact and hence damage the endless rings which is mounted in the recesses between the body and the head.

It has heretofore been known in the art to a dedicated deburring device for removing the burrs from the opposite edges of the neck. The deburring device has a polishing belt which is inserted into the recesses between the body and the head of each individual element to deburr the opposite edges of the neck.

The deburring device is liable to increase the manufacturing cost of the element, increase the number of steps required to produce the element, and reduce the efficiency with which to produce the element.

SUMMARY OF THE INVENTION

It is therefore an object of the present invention to provide a method of blanking an element to shape highly accurately for preventing endless rings, to be combined with elements, from being damaged by contact therewith, so that the cost and number of steps required by deburring the element can be reduced.

According to the present invention, there is provided a method of blanking an element for a belt for use in a continuously variable transmission which is produced by stacking a plurality of plate-shaped elements each having a body with opposite side edges positioned for contact with a pulley of the continuously variable transmission and a head joined to the body by a narrower neck, and inserting endless rings into recesses defined between the body and the neck by the neck. In the method, an element is blanked out of a metal sheet with a press having a die and a punch. The die and the punch have respective cutting edges, the cutting edge of the punch being more widely spaced from the cutting edge of the die in a range of the element which includes edges of the neck, edges of the head contiguous to the edges of the neck and close to the neck, and edges of the body contiguous to the edges of the neck and close to the neck, than in another range of the element.

When the element is blanked out of the metal sheet by the punch and the die, the edges of the neck, the edges of the head, and the edges of the body are formed of a sheared surface in a transverse direction of the edges and a ruptured surface contiguous to the sheared surface, and a burr is formed next to the ruptured surface in a position out of contact with the endless rings.

When the element is blanked out of the metal sheet by the coaction of the punch and the die, a shear droop, a sheared surface, and a ruptured surface are successively formed in the transverse direction from the die toward the punch on the blanked edge of the element, and a burr is formed contiguous to the ruptured surface along the side wall of the punch. If the distance between the cutting edge of the die and the cutting edge of the punch is relatively small, the extent of the shearing surface is increased and the extents of the shear droop and the ruptured surface are reduced, resulting in a highly accurate blanked edge with a burr positioned highly closely to the blanked edge of the element. Conversely, if the distance between the cutting edge of the die and the cutting edge of the punch is relatively large, then the extent of the shearing surface is reduced and the extents of the shear droop and the ruptured surface are increased, so that a burr is formed next to the ruptured surface in a position spaced from the blanked edge of the element.

According to the present invention, the distance between the cutting edge of the die and the cutting edge of the punch is partly varied to locate the burr on the edges of the neck, the edges of the head contiguous to the edges of the neck and close to the neck, and the edges of the body contiguous to the edges of the neck and close to the neck, in a position out of contact with the endless rings without lowering the accuracy with which to blank the element.

Specifically, in the range including the edges of the neck, the edges of the head contiguous to the edges of the neck and close to the neck, and the edges of the body contiguous to the edges of the neck and close to the neck, the element is blanked out of the metal sheet by the punch whose cutting edge is widely spaced from the cutting edge of the die. For example, the cutting edge of the punch and the cutting edge of the die are spaced from each other by a distance which is 5 to 10% of the thickness of the element in the range of the element which includes the edges of the neck, the edges of the head, and the edges of the body.

With this arrangement, a larger ruptured surface is formed on the edges of the neck, the edges of the head contiguous to the edges of the neck and close to the neck, and the edges of the body contiguous to the edges of the neck and close to the neck, than on other blanked edges. Thus, the burr may easily be formed in a position on one side of the element out of contact with the endless rings.

The burr which is formed on the edges of the neck, the edges of the head contiguous to the edges of the neck and close to the neck, and the edges of the body contiguous to the edges of the neck and close to the neck is sufficiently exposed on one side of the element. When the element is deburred by barrel polishing, the medium used in the barrel polishing is brought into sufficient contact with the burr for thereby easily removing the burr. Consequently, it is not necessary to deburr the element with a conventional dedicated deburring device, and the element can be manufactured with a reduced cost. Inasmuch as the burr is formed in a position out of contact with the endless rings, the endless rings will be prevented from damage even if the removal of the burr by the barrel polishing is not sufficient.

The cutting edge of the punch and the cutting edge of the die should preferably be spaced from each other by a distance which is 0 to 1% of the thickness of the element in the other range of the element. With this distance setting, it is possible to form a sheared surface which is wide in the transverse direction of the element on opposite side edges of the body for contact with pulleys of the continuously variable transmission. As a result, a highly accurate element for a belt for use in a continuously variable transmission can be manufactured.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

A blanking method according to the present invention is used to manufacture an element 1 (see FIG. 6) for a belt for use in a continuously variable transmission (not shown). A plurality of elements 1 are stacked into an annular shape, and bound together by endless rings 2 of metal, thus producing a belt for use in a continuously variable transmission. Each of the endless rings 2 comprises a stack of plate-like ring members.

Figure 1:
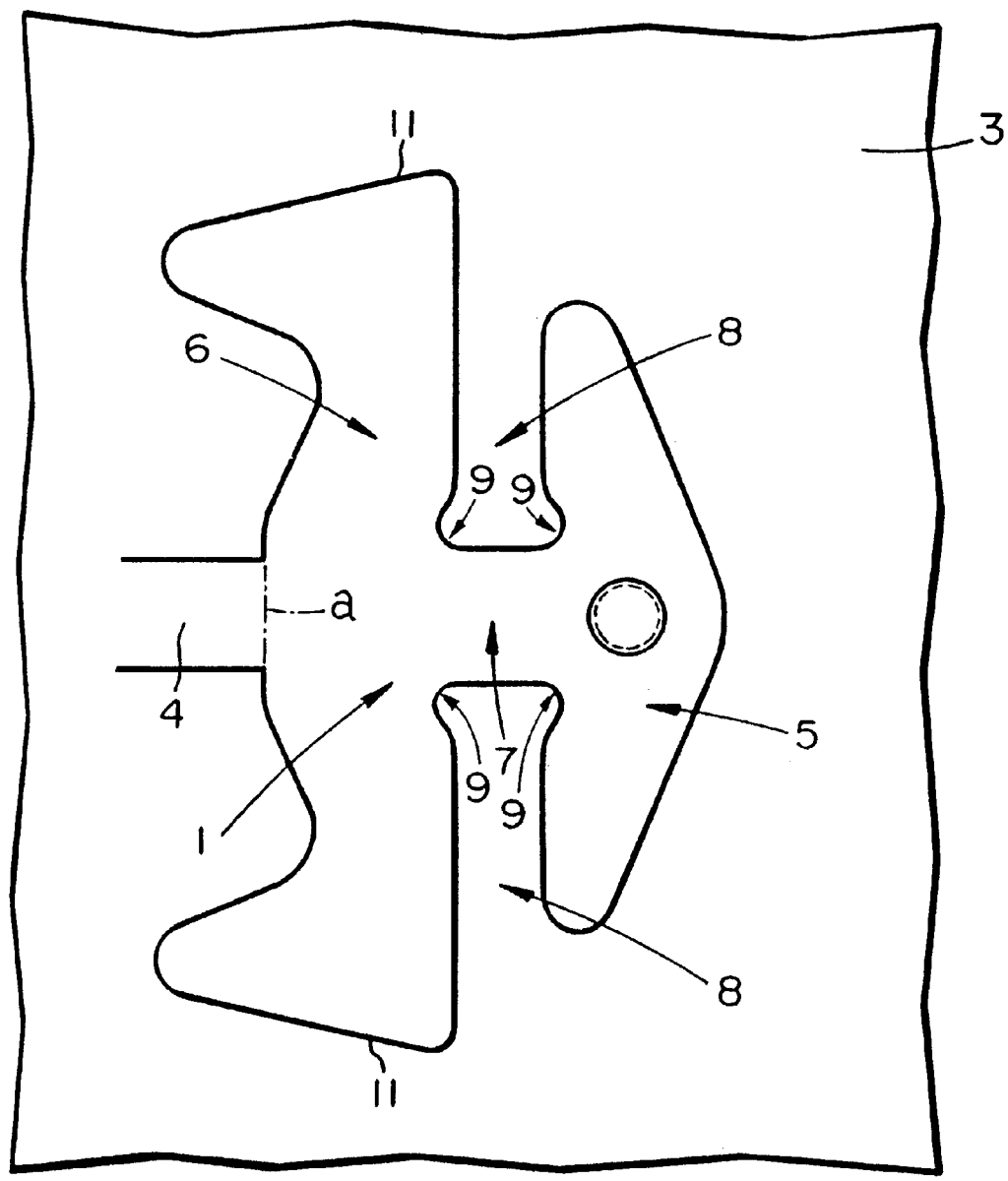
FIG. 1 is a plan view showing the blanked shape of an element produced by a blanking step of a method according to the present invention.

As shown in FIG. 1, the element 1 is blanked out of a metal sheet 3. When the element 1 is blanked, it remains connected to the metal sheet 3 by a joint 4. Thereafter, the joint 4 is cut off along a boundary between the joint 4 and the element 1 as indicated by the imaginary line a in FIG. 1, thus separating the element 1 from the metal sheet 3.

Figure 6:
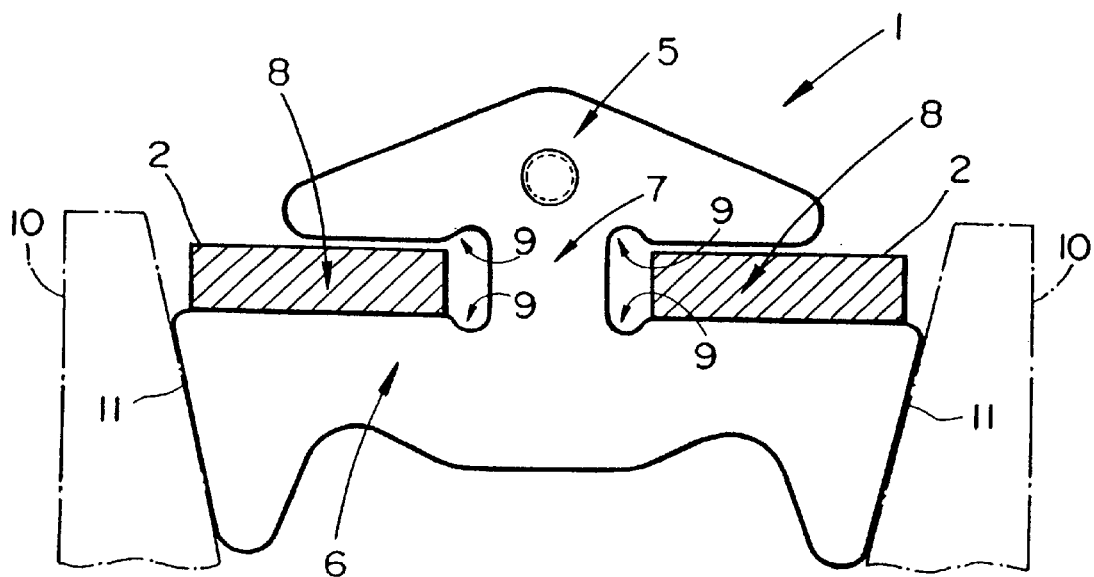
FIG. 6 is a plan view of an element for a belt for use in a continuously variable transmission.

The shape of the element 1 thus blanked and separated will briefly be described below with reference to FIG. 6. The element 1 comprises a substantially triangular head 5 which will be positioned on an outer circumferential edge of the belt for use in the continuously variable transmission, and a body 6 which will be positioned on an inner circumferential edge of the belt. The head 5 and the body 6 are integrally joined to each other by a neck 7. The head 5, the body 6, and the neck 7 joined therebetween jointly define a pair of recesses 8 between the head 5 and the body 6 and on opposite sides of the neck 7. When the continuously variable transmission is assembled, the endless belts 2 are inserted in the respective recesses 8. The element 1 includes undercuts 9 defined in edges of the head 5 and the body 6 at boundaries between the neck 7 and the head 5 and between the neck 7 and the body 6. The body 6 has a pair of pulley contact surfaces 11 on its opposite ends for contact with a pulley 10, indicated by the imaginary lines in FIG. 6, of the continuously variable transmission.

Figure 2:
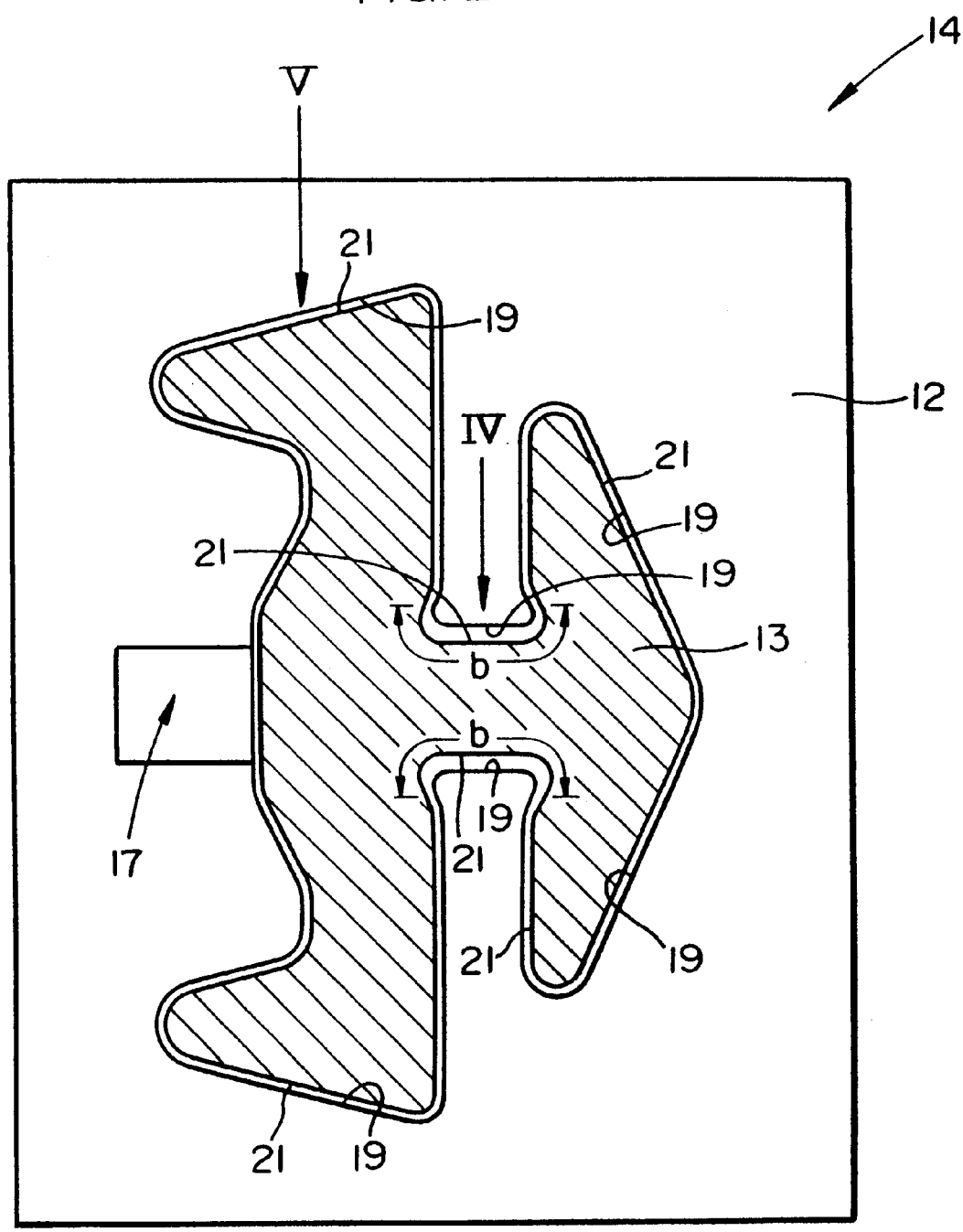
FIG. 2 is a plan view of a die and a punch used in the blanking step.
Figure 3A:
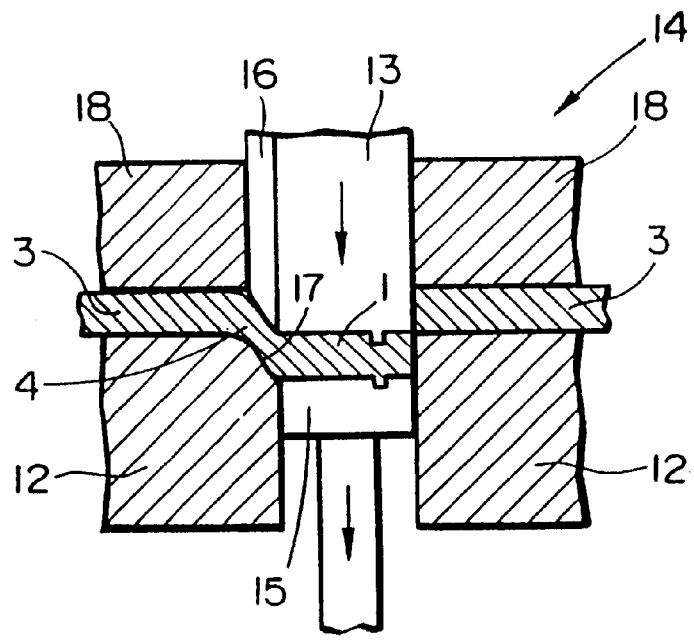
FIG. 3(a) is a cross-sectional view illustrative of a phase of the blanking step.
Figure 3B:
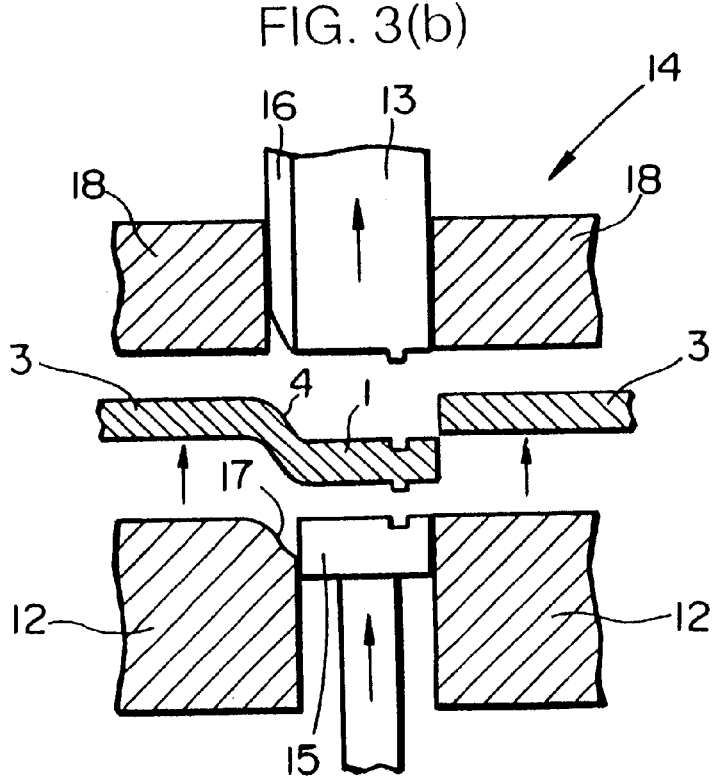
FIG. 3(b) is a cross-sectional view illustrative of another phase of the blanking step which follows the phase shown in FIG. 3(a)

A process of blanking the element 1 will be described below. As shown in FIGS. 2 and 3(a), 3(b), the element 1 is blanked by a press 14 having a die 12 and an element forming punch 13. The metal sheet 3 is placed on the die 12, and the element forming punch 13 is lowered across the metal sheet 13 into the die 12, thus blanking an element shape out of the metal sheet 3. As shown in FIGS. 3(a) and 3(b), a counterpunch 15 is disposed below the element forming punch 13 in vertically confronting relation thereto. The counterpunch 15 is movable downwardly in unison with the element forming punch 13. A joint forming punch 16 for forming the joint 4 is disposed on one side of the element forming punch 13. The die 12 has a clearance 17 defined in a portion thereof which is in vertical alignment with the joint forming punch 16. A pad 18 for pressing the metal sheet 3 against the die 12 is disposed above the die 12.

As shown in FIG. 2, the die 12 has a cutting edge 19 extending along an inner peripheral edge thereof complementary in shape to the element forming punch 13.

The element forming punch 13 also has a cutting edge 21 extending along an outer peripheral edge thereof complementary in shape to the cutting edge 19. As shown FIGS. 4(a) and 5(a), the cutting edge 21 is sharply defined along the entire length thereof. As shown in FIG. 2, the cutting edge 21 is spaced more widely from the cutting edge 19 in a pair of opposite ranges b including the edges of the neck 7 and the undercuts 9. Specifically, the distance between the cutting edge 21 of the element forming punch 13 and the cutting edge 19 of the die 12 in the ranges b is set to 5 to 10% of the thickness of the element 1, and the distance between the cutting edge 21 of the element forming punch 13 and the cutting edge 19 of the die 12 in ranges other than the ranges b is set to 0 to 1% of the thickness of the element 1.

In the blanking process, the metal sheet 3 placed on the die 12 is fixedly pressed against the die 12 by the pad 18.

Then, as shown in FIG. 3(a), while the metal sheet 3 is borne by the counterpunch 15 from below the metal sheet 3, the element forming punch 13 is lowered to blank the element 1 out of the metal sheet 3 in coaction with the die 12.

Figure 4A:
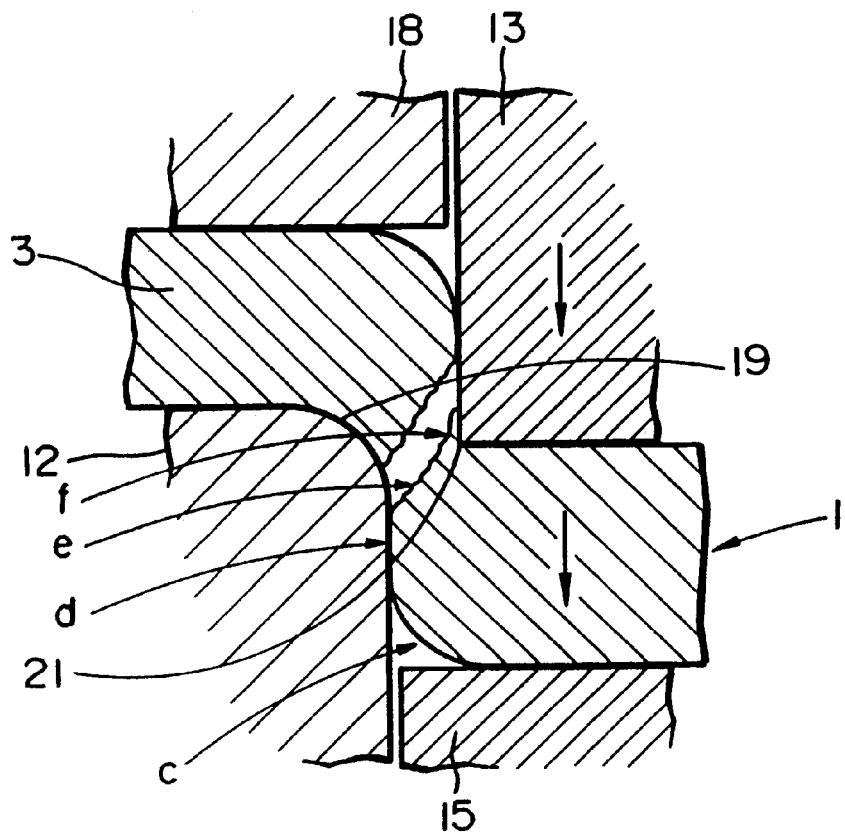
FIG. 4(a) is a cross-sectional view showing a blanking operation of parts involved in a position indicated by the arrow IV in FIG. 2.
Figure 4B:
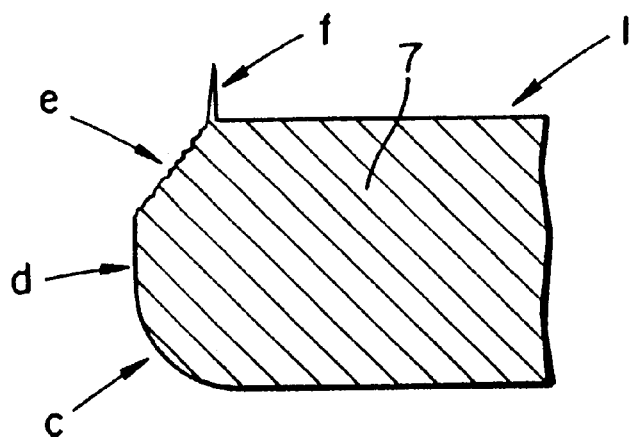
FIG. 4(b) is a cross-sectional view of an edge of the element produced by the blanking operation shown in FIG. 4(a)

At this time, in the position indicated by the arrow IV in FIG. 2, i.e., in the range b, the element 1 is blanked by the cutting edge 19 of the die 12 and the cutting edge 21 of the element forming punch 13, as shown in FIG. 4(a). At the blanked edge of the element 1 (at the neck 7 in FIG. 4), the element 1 has a relatively large ruptured surface e next to a sheared surface d due to the relatively large gap between the cutting edge 19 and the cutting edge 21. The element 1 also has a burr f next to the ruptured surface e along the side wall of the element forming punch 13. As shown in FIG. 4(b), the ruptured surface e is inclined toward the upper surface of the element 1 at an angle depending on the gap between the cutting edge 19 and the cutting edge 21. The burr f is fully exposed on one side of the element 1, and is formed in a position out of contact with the endless ring 2 (see FIG. 6).

Figure 5A:
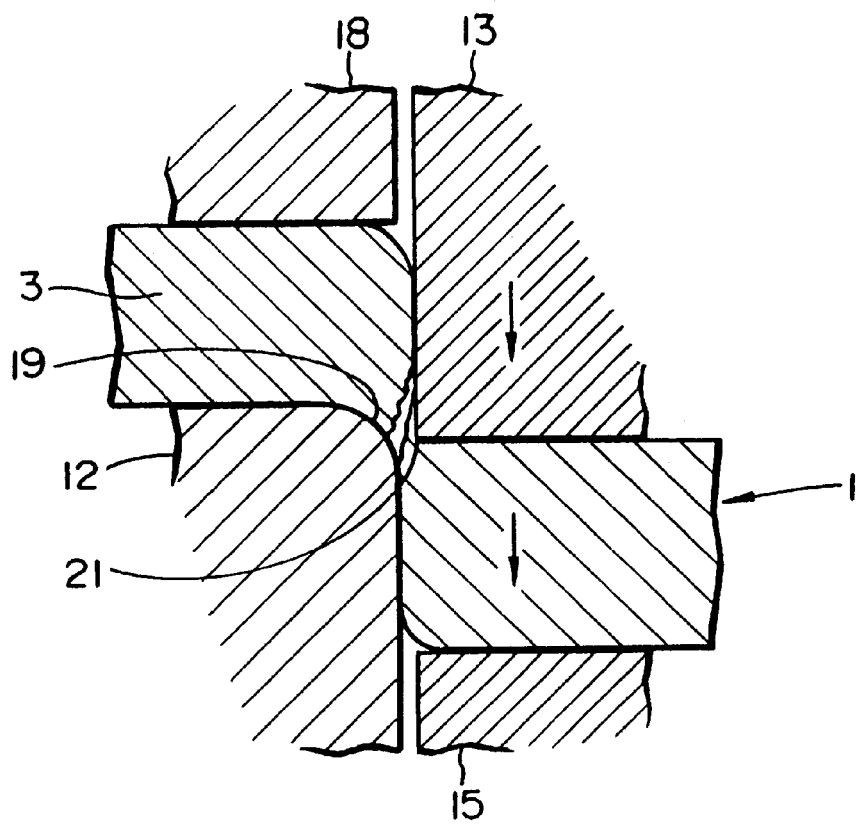
FIG. 5(a) is a cross-sectional view showing a blanking operation of parts involved in a position indicated by the arrow IV in FIG. 2.
Figure 5B:
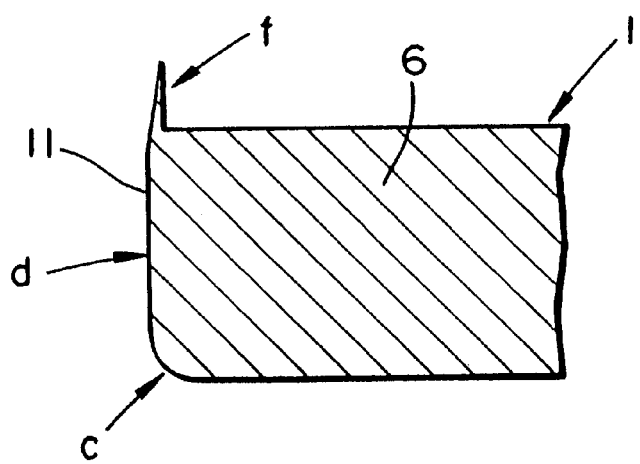
FIG. 5(b) is a cross-sectional view of an edge of the element produced by the blanking operation shown in FIG. 5(a)

In the position indicated by the arrow V in FIG. 2, i.e., in the range other than the range b, the element 1 is blanked by the cutting edge 19 of the die 12 and the cutting edge 21 of the element forming punch 13, as shown in FIG. 5(a). At the blanked edge of the element 1 (at the surface 11 of the body 6 for contact with the pulley 10 in FIGS. 5(a) and 5(b)), the element 1 has a burr f contiguous to the sheared surface d and extending along the side wall of the element forming punch 13 due to the relatively small gap between the cutting edge 19 and the cutting edge 21. As shown in FIG. 5(b), the peripheral edges of the head 5 and the body 6 which are positioned in the ranges other than the ranges b are formed highly accurately by the sheared surface d which is relatively large.

At the same time, as shown in FIG. 5(a), the joint forming punch 16 lowered in unison with the element forming punch 13 and the clearance 17 of the die 12 positioned in vertical alignment wit the joint forming punch 16 jointly produce the joint 4 between the element 1 and the metal sheet 3.

Then, as shown in FIG. 3(b), the element forming punch 13, the joint forming punch 16, the counterpunch 15, and the pad 18 are elevated. The metal sheet 3 with the element 1 joined thereto by the joint 4 is removed from the press 14, and the joint 4 is cut off by a cutting device.

The element 1 severed from the metal sheet 3 is then deburred by barrel polishing. Since the burr f formed on the peripheral edges of the body 6 and the head 5 is positioned on outer peripheral edges of the element 1, the medium used in the barrel polishing is brought into sufficient contact with the burr f to remove the burr f, even though the burr f is contiguous to the sheared surface d as shown in FIG. 5(b). Since the burr f formed on the edges of the neck 7 and the undercuts 9 is fully exposed on one side of the element 1, as shown in FIG. 4(a), the medium used in the barrel polishing is brought into sufficient contact with the burr f to remove the burr f. Furthermore, as shown in FIG. 4(b), inasmuch as the burr f is formed in a position out of contact with the endless ring 2, the endless ring 2 will be prevented from damage even if the removal of the burr f by the barrel polishing is not sufficient.

Although a certain preferred embodiment of the present invention has been shown and described in detail, it should be understood that various changes and modifications may be made therein without departing from the scope of the appended claims.

What is claimed is:

1. A method of blanking an element for a belt for use in a continuously variable transmission which is produced by stacking a plurality of plate-shaped elements, each having a body with opposite side edges positioned for contact with a pulley of the continously variable transmission and a head joined to the body by a narrower neck, and inserting endless rings into recesses defined between the body and the head by the neck, comprising the steps of:

blanking an element out of a metal sheet with a press having a die and a punch, said die and said punch having respective cutting edges, the cutting edge of said punch being more widely spread from the cutting edge of said die in a range of the element which includes edges of the neck, and a first portion of edges of the head and body contiguous to said edges of the neck and close to said neck, than in another range of the element which includes a second portion of edges of the head and body other than the first portion of edges of the body;

forming said edges of the neck, and the first portion of said edges of the head, and body, of a sheared surface in a transverse direction of said edges and a ruptured surface contiguous to said sheared surface, and forming a burr next to said ruptured surface in a position out of contact with the endless rings.

2. The method according to claim 1, wherein the cutting edge of said punch and the cutting edge of said die are spaced from each other by a distance which is 5 to 10% of the thickness of the element in said range of the element which includes said edges of the neck, said edges of the head, and said edges of the body.

3. The method according to claim 1, wherein the cutting edge of said punch and the cutting edge of said die are spaced from each other by a distance which is 0 to 1% of the thickness of the element in said another range of the element.

4. The method according to claim 2, wherein the cutting edge of said punch and the cutting edge of said die are space from each other by a distance which is 0 to 1% of the thickness of the element in said another range of the element.

5. A method of blanking an element for a belt for use in a continuously variable transmission which is produced by stacking a plurality of plate-shaped elements, each having a body with opposite side edges positioned for contact with a pulley of the continuously variable transmission, a head joined to the body by a narrower neck, and undercuts defined in edges of the head and body at boundaries between the neck and the head and between the neck and the body, and inserting endless rings into recesses defined between the body and the head by the neck, comprising the steps of:

blanking an element out of a metal sheet with a press having a die and a punch, said die and said punch having respective cutting edges, the cutting edge of said punch being more widely spread from the cutting edge of said die in a range of the element which includes edges of the neck, and edges of the undercuts, than in another range of the element, which includes a portion of edges of the head and body other than edges of the undercuts;

forming said edges of the neck, and the first portion of said edges of the undercuts, of a sheared surface in a transverse direction of said edges and a ruptured surface contiguous to said sheared surface, and forming a burr next to said ruptured surface in a position out of contact with the endless rings.

* * * * *